US012704436B2

(12) United States Patent
Eakins et al.

(10) Patent No.: US 12,704,436 B2
(45) Date of Patent: Aug. 11, 2026

(54) BALER WITH BEARING HEALTH MONITOR

(71) Applicant: DEERE & COMPANY, Moline, IL (US)

(72) Inventors: Nolan D. Eakins, Bloomfield, IA (US); Bart A. Coffman, Eddyville, IA (US)

(73) Assignee: DEERE & COMPANY, Moline, IL (US)

( * ) Notice: Subject to any disclaimer, the term of this patent is extended or adjusted under 35 U.S.C. 154(b) by 635 days.

(21) Appl. No.: 18/178,309

(22) Filed: Mar. 3, 2023

(65) Prior Publication Data

US 2024/0295467 A1 Sep. 5, 2024

(51) Int. Cl.

*G01M 13/045* (2019.01)
*A01F 15/07* (2006.01)
*A01F 15/08* (2006.01)

(52) U.S. Cl.

CPC ........... *G01M 13/045* (2013.01); *A01F 15/07* (2013.01); *A01F 15/08* (2013.01); *A01F 2015/077* (2013.01)

(58) Field of Classification Search

CPC ....... G01M 13/045; A01F 15/07; A01F 15/08; A01F 2015/077

See application file for complete search history.

(56) References Cited

U.S. PATENT DOCUMENTS 6,053,047 A * 4/2000 Dister ................. G01M 13/028 73/660
2005/0155429 A1 7/2005 Griessler et al.
2019/0250069 A1* 8/2019 Samadani .............. G06N 20/00
2020/0093067 A1* 3/2020 Monteyne ........... A01F 15/0715
2021/0223094 A1 7/2021 Hedin
2022/0346324 A1* 11/2022 Casadei .................. A01F 15/07

OTHER PUBLICATIONS

John Deere UK IE. John Deere Fixed Chamber Balers—Animation. Youtube Video. Available online at https://www.youtube.com/watch?v=UEVXWkm4-AM. Publicly available Oct. 19, 2016 (3 pages).

Extended European Search Report and Written Opinion issued in European Patent Application No. 24158041.4 dated Apr. 17, 2024, in 11 pages.

Sadoughi Mohammadkazem et al., Physics-Based Convolutional Neural Network for Fault Diagnosis of Rolling Element Bearings, IEEE Sensors Journal, IEEE, USA, vol. 19, No. 11, Feb. 10, 2019, pp. 4181-4192, [online], [retrieved on May 3, 2019]. Retrieved from the Internet <URL: https://ieeexplore.ieee.org/stamp/stamp.jsp?tp=&arnumber=8638772>, ISSN: 1530-437X, DOI: 10.1109/JSEN.2019.2898634.

* cited by examiner

*Primary Examiner* — Kito R Robinson
*Assistant Examiner* — Erin Marie Hartmann
(74) *Attorney, Agent, or Firm* — Michael Best & Friedrich LLP

(57) ABSTRACT

A baler including an accelerometer coupled to the frame and configured to output a bulk signal representative of the total vibrational power in the frame, and a controller in operable communication with the accelerometer, where the controller is configured to deconstruct the bulk output signal provided by the accelerometer into at least a first component signal and a second component signal, and where the controller is configured to associate one of the first component signal and the second component signal with a first bearing and the other of the first component signal and the second component signal with a second bearing.

18 Claims, 5 Drawing Sheets

User Interface
112
36 Controller
100
104
Memory Unit
Processor
10
70b
70c
6
64
11
70a
26
4
74
70c
7
30
34
5
70c
70c
3
60
12
10
108 Sensor
2
70e
13
8
66
9
70c
1
70a
86
70d
18
50

BALER WITH BEARING HEALTH MONITOR

FIELD OF THE INVENTION

The present disclosure relates to a baler and more specifically to a baler having a system for measuring and monitoring the health of bearings inside the baler.

BACKGROUND

Round balers include a series of rotational elements that are supported by various types of bearings. Failure of one or more of these bearings can result in the inability of the baler to operate.

SUMMARY

In one embodiment, a baler including a frame, one or more wheels rotatably mounted to the frame, a bale forming system including, a first rotational element rotatably coupled to the frame by a first bearing for rotation about a first axis, where the first bearing is a first bearing type, and a second rotational element rotatably coupled to the frame by a second bearing for rotation about a second axis, where the second bearing is a second bearing type different than the first bearing type, an accelerometer coupled to the frame and configured to output a bulk signal representative of the total vibrational power in the frame, and a controller in operable communication with the accelerometer, where the controller is configured to deconstruct the bulk output signal provided by the accelerometer into at least a first component signal and a second component signal, and where the controller is configured to associate one of the first component signal and the second component signal with the first bearing and the other of the first component signal and the second component signal with the second bearing.

Alternatively or additionally, in any combination, where the controller deconstructs the bulk output signal into two or more component by decomposing the component vibration power levels by frequency.

Alternatively or additionally, in any combination, where the controller deconstructs the bulk output signal by passing the bulk output signal through a form of a Fourier transform.

Alternatively or additionally, in any combination, the first rotational element rotates about the first axis at a first rotational speed, and where the controller is configured to calculate a first bearing frequency for the first bearing based at least on the first rotational speed.

Alternatively or additionally, in any combination, where the controller associates one of the first component signal and the second component signal with the first bearing based at least in part on the first bearing frequency.

Alternatively or additionally, in any combination, where the controller is configured to compare at least one of the first component signal and the second component signal with a pre-determined set of operating parameters.

Alternatively or additionally, in any combination, where the pre-determined set of parameters are modeled at least in part on the first bearing type.

Alternatively or additionally, in any combination, where the first rotational element rotates about the first axis and the second rotational element rotates about the second axis at the same speed.

Alternatively or additionally, in any combination, whereat least one of the first rotating element and the second rotating element includes a roller configured to at least partially support a belt thereon.

Alternatively or additionally, in any combination, where the controller is configured to calculate a first bearing frequency for the first bearing based at least in part on the bearing size and the bearing element number.

In another embodiment, a method of monitoring the health of a plurality of bearing groups in a baler having an accelerometer fixedly coupled to the frame thereof, the method including outputting a bulk signal representative of the vibrational power within the frame, deconstructing the bulk signal into two or more component signals, associating at least one of the component signals with a corresponding bearing group, comparing the at least one component signal to a corresponding set of operational parameters, and outputting an alert to the user if the at least one component signal falls outside the corresponding set of operational parameters.

Alternatively or additionally, in any combination, where deconstructing the bulk signal into two or more component signals includes showing the component vibration power levels by frequency.

Alternatively or additionally, in any combination, where deconstructing the bulk signal into two or more component signals includes running the bulk signal through a form of Fourier transform.

Alternatively or additionally, in any combination, where associating a component signal with a corresponding bearing group includes calculating a bearing frequency for each bearing group, and associating a component signal with a given bearing group based at least in part on the calculated bearing frequency.

Alternatively or additionally, in any combination, where deconstructing the bulk signal into two or more component signals includes showing the component vibration power levels by frequency.

Alternatively or additionally, in any combination, where associating the component signal with a given bearing group means matching the calculated bearing frequency with the component vibration power level frequency.

Alternatively or additionally, in any combination, where outputting a bulk signal representative of the vibrational power within the frame includes outputting a bulk signal representative of the vibrational power within the frame along the X, Y, and Z axis.

Alternatively or additionally, in any combination, where each bearing in a given bearing group is a first bearing type, and wherein the corresponding set of operational parameters is based at least in part on the first bearing type.

Other aspects of the disclosure will become apparent by consideration of the detailed description and accompanying drawings.

DETAILED DESCRIPTION

Before any embodiments of the disclosure are explained in detail, it is to be understood that the disclosure is not limited in its application to the details of the formation and arrangement of components set forth in the following description or illustrated in the accompanying drawings. The disclosure is capable of supporting other implementations and of being practiced or of being carried out in various ways.

The disclosure relates to balers and more particularly to balers having a control system configured to record the overall vibrations in the frame of the baler, decompose the overall vibrations into component signals, and attribute the various component signals to pre-determined sub-groups of bearings located within the baler itself. Once the component signals have been decomposed and attributed, the controller is configured to monitor the decomposed signals over a period of time, apply the decomposed signals to one or more algorithms generally modeling the lifecycle of the applicable bearings, and output alerts to the user regarding the operational status of each sub-group of bearings. More specifically, the controller is configured to monitor the operation of each sub-group of bearings and output an alert to the user when a failure condition is detected. By only requiring the overall or bulk vibration signal as an input to the system, the system is able to monitor multiple bearings within the baler while only requiring the presence of a single accelerometer.

Figure 1:
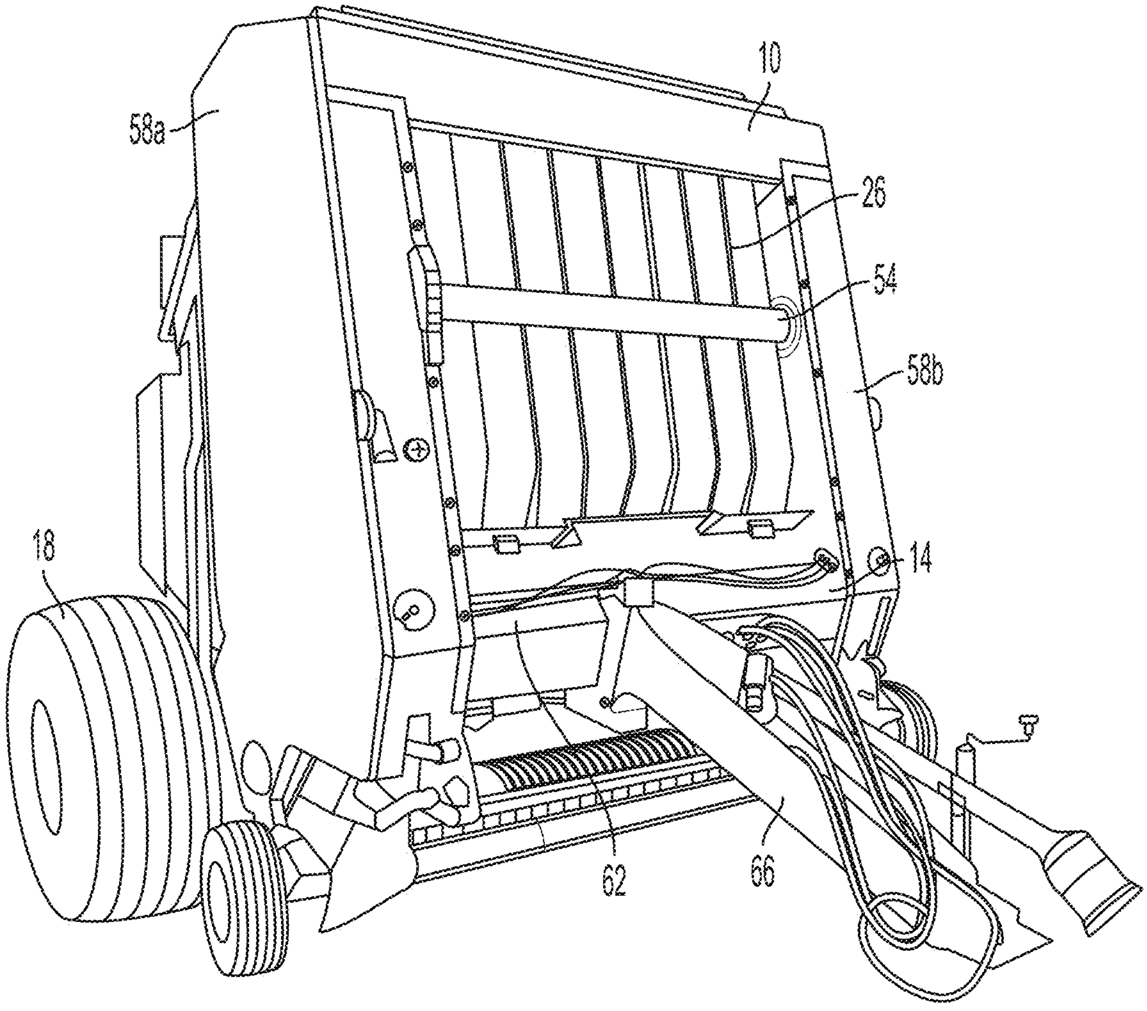
FIG. 1 is a perspective view of a round baler with a bearing health monitor.
Figure 2:
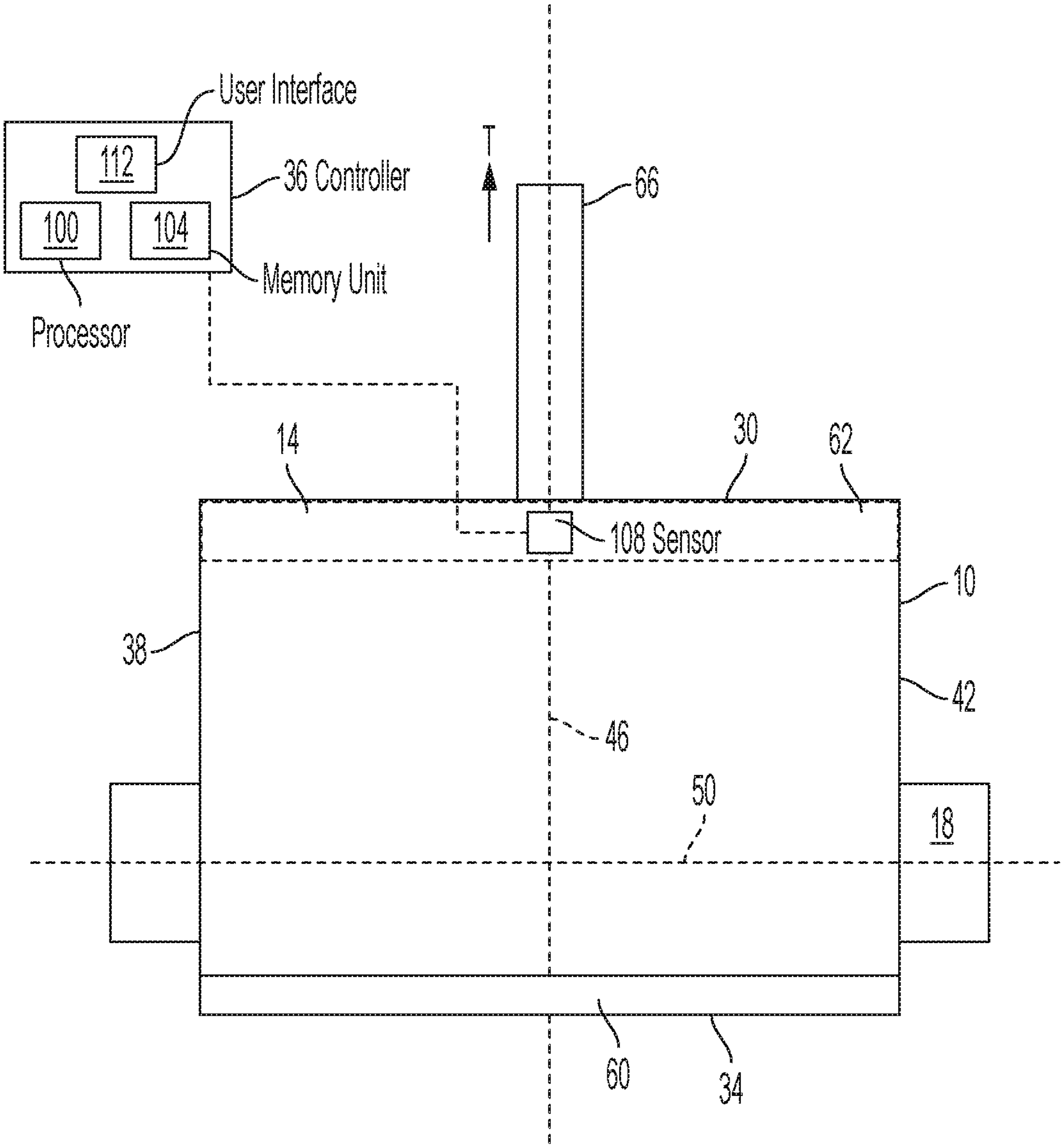
FIG. 2 is a top view of the round baler of FIG. 1.
Figure 3:
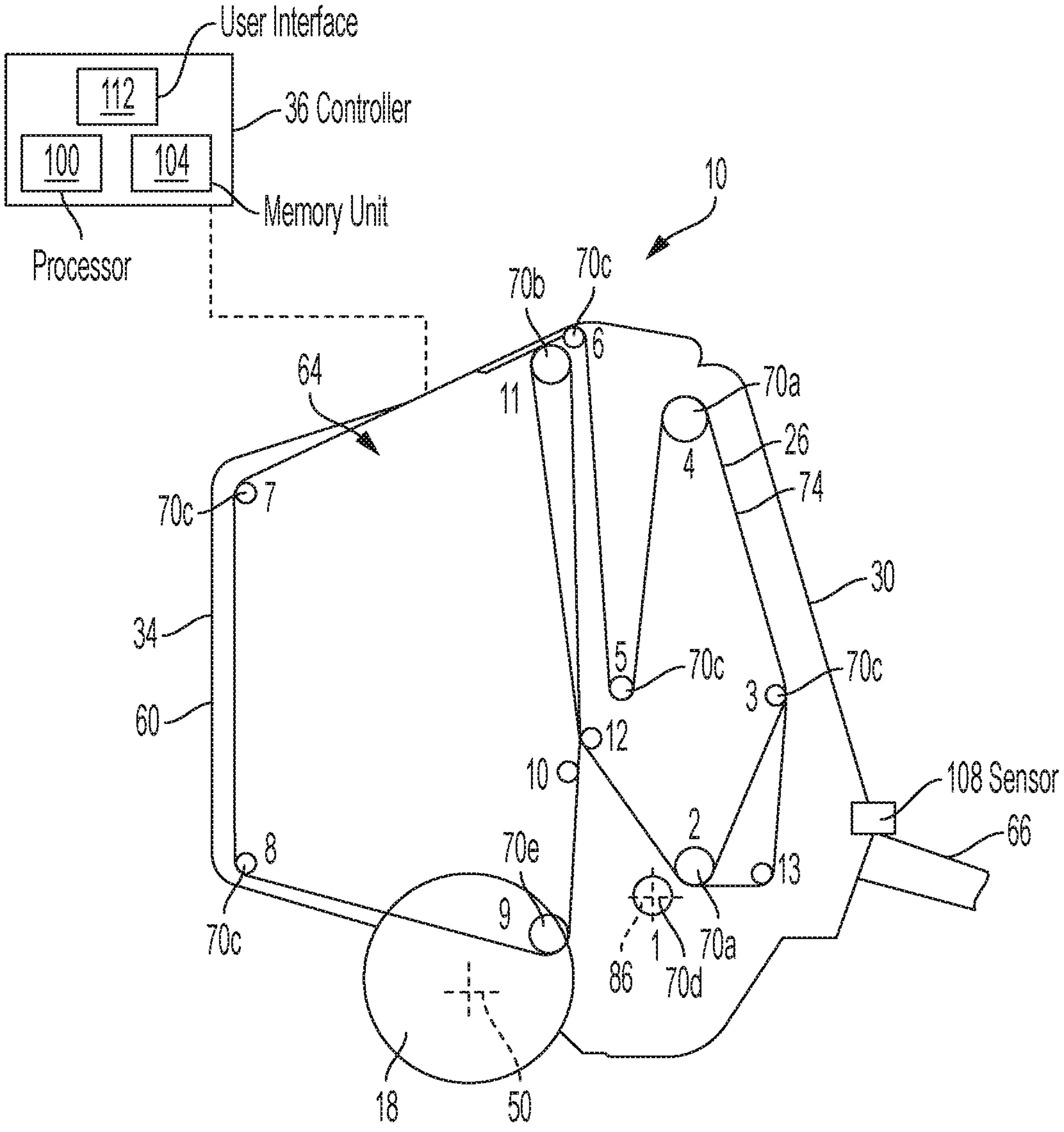
FIG. 3 is a side plan view of the round baler of FIG. 1.

Referring to FIGS. 1-3, a baler 10 includes a frame 14, a set of wheels 18 mounted to the frame 14, a bale forming system 26, and a controller 36 to monitor and direct the baling operations. During use, the bale forming system 26 is configured to collect and process crop material into individual bales. In the illustrated implementation, the baler 10 is a round baler for creating cylindrical finished bales of a crop material, such as hay, straw, or other biomasses. However, in other embodiments the controller 36 may be installed on different forms of balers with rotational elements included therein, such as rectangular balers and the like.

The baler 10 includes a leading end 30 facing the direction of travel T, a trailing end 34 opposite the leading end 30, a first or left side 38, and a second or right side 42. The baler 10 also defines a longitudinal axis 46 positioned at the lateral center of the baler 10 (e.g., midway between the first and second sides 38, 42) and extending through the leading and trailing ends 30, 34 (e.g., perpendicular to the wheel axis 50; see FIG. 2).

In the illustrated implementation, the frame 14 of the baler 10 includes a collection of framework 54 and housing elements or panels 58*a*, 58*b* configured to at least partially enclose and support the bale forming system 26. More specifically, the frame 14 of the illustrated baler 10 includes a steel frame formed from multiple elongated elements welded or otherwise coupled together including, but not limited to, a cross-tube 62 and a tongue 66. The cross-tube 62 of the frame 14 includes an elongated member oriented perpendicular to the longitudinal axis 46 (e.g., perpendicular to the wheel axis 50) and extending approximately the entire width of the baler 10. The cross-tube 62 is also positioned proximate the leading end 30 of the baler 10 such that the tongue 66 extends outwardly, generally in the direction of travel T, therefrom.

The frame 14 also includes a series of panels 58*a*, 58*b* at least partially enclosing the bale forming system 26. More specifically, the frame 14 at least includes a first side panel 58*a* at least partially enclosing the first side 38 of the baler 10 and a second side panel 58*b* at least partially enclosing the second side 42 of the baler 10. Both side panels 58*a, b* are generally formed from sheet material (e.g., sheet metal) and coupled to the underlying framework 54.

The frame 14 also forms a gate or door 60 at the trailing end 34 thereof to provide selective access to a bale chamber 64 in which the bale is formed. During use, the gate 60 is pivotable with respect to the frame 14 between an open position (not shown), in which the bale chamber 64 is accessible from the outside, and a closed position (see FIG. 3), in which the bale chamber 64 cannot be accessed from the outside. The gate 60 may also define a "gate angle" between the gate 60 and the frame 14. In the illustrated embodiment, a gate angle of 0 degrees represents the gate 60 in the closed position while the gate angle increases as the gate pivots toward the open position.

Figure 3A:
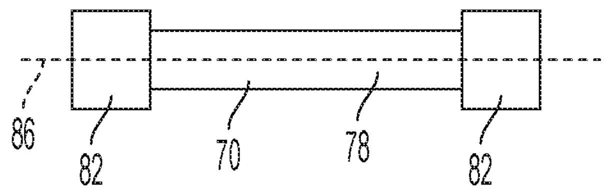
FIG. 3A illustrates a roller for use in the round baler of FIG. 1.

Illustrated in FIGS. 3 and 3A, the bale forming system 26 includes a plurality of rollers 70, belts 74, and other rotational elements that together are configured to both directly and indirectly support and handle the crop material as it is formed into the desired bail shape. The specific layout and construction of the bale forming system 26 may vary depending on the specific baler design 10.

Each roller 70 of the bale forming system 26 includes an elongated body 78 mounted either directly or indirectly to the frame 14 via a pair of bearings 82 for rotation with respect thereto about a corresponding roller axis 86. During operation, each roller 70 is configured to rotate with respect to the frame 14 about a roller axis 86 at a roller speed 92*a-c* that corresponds directly with an overall operational speed of the baler 10 (e.g., as established by a reference speed). In the illustrated embodiment, each roller 70 is generally oriented perpendicular to the longitudinal axis 46 (e.g., parallel to the wheel axis 50). However, in other embodiments, the roller axis 86 may not be oriented perpendicular to the longitudinal axis 46 and instead may be oriented differently with respect thereto.

The bearings 82 for each roller 70 are generally classified into one of a plurality of different bearing types 94*a-d*. Each bearing type 94*a-d*, in turn, is established by a number of different bearing attributes including, but not limited to, the bearing dimensions, the bearing element number (e.g., the number of bearing elements present in the bearing), the bearing material (e.g., the material of the bearing race and/or bearing elements), the bearing element style (e.g., roller elements, ball elements, needle elements, and the like), the bearing layout (e.g., thrust bearings, tapered bearings, deep groove bearings, sealed bearings, and the like), and any combination thereof. In some embodiments, a sub-set of the above-listed attributes may be taken into account when establishing bearing types 94*a-d*. For example, in some embodiments individual bearings 82 may be classified into types 94*a-d* based solely on the bearing diameter and the bearing element number while including bearings 82 having different bearing materials, element styles, and the like. However, in other embodiments, different combinations of attributes may be emphasized and de-emphasized when establishing the plurality of bearing types 94*a-d*.

As shown in FIG. 3, the bale forming system 26 includes one or more drive rolls 70*a*, one or more idler/drive rolls 70*b*, one or more idler rolls 70*c*, one or more starter rolls 70*d*, and one or more gate rolls 70*e*. Together, the rolls 70*a-e*, form one or more pathways about which the belts 74 may be wound and operated. Each roll 70*a-e* is generally formed as an assembly including the roll body 78 and two bearings 82 on either side thereof to support the roll body 78.

Figure 5:
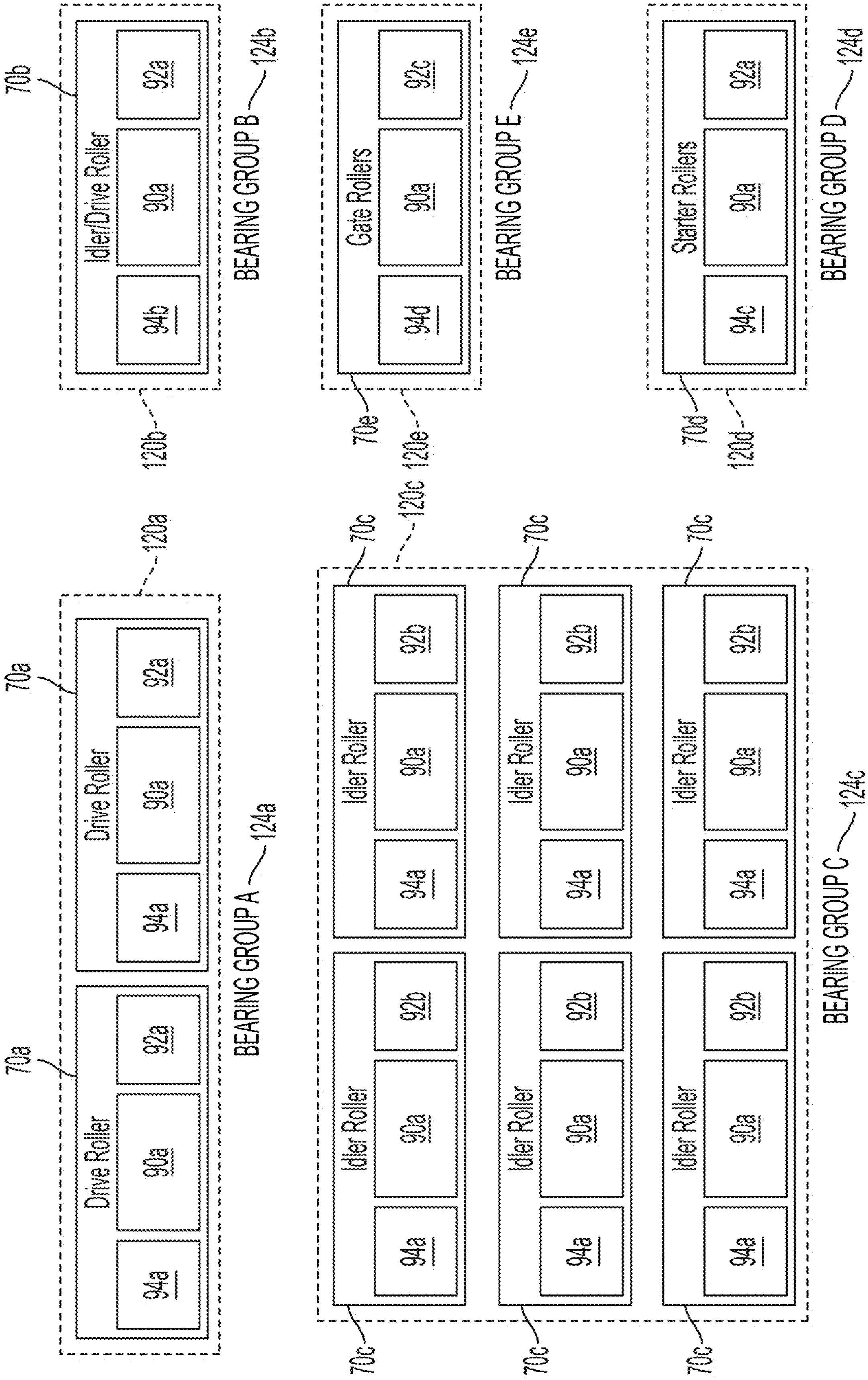
FIG. 5 is a diagram of a plurality of bearings organized into bearing groups.

As shown in FIG. 5, each drive roller 70*a* of the bale forming system 26 includes a first bearing type 94*a* (e.g., the same being dimensions and bearing element number), a common first roller axis orientation 90*a* (e.g., perpendicular to the longitudinal axis 46), and rotate at a first roller speed 92*a*. In the illustrated embodiment, the bale forming system 26 includes two drive rollers 70*a* (see FIG. 3).

As shown in FIG. 5, each idler/drive roller 70*b* of the bale forming system 26 includes a second bearing type 94*b* different than the first bearing type 94*a* of the drive rollers 70*a*, have a roller axis in the first roller axis orientation 90*a* (e.g., perpendicular to the longitudinal axis 46), and rotate at the first roller speed 92*a*. In the illustrated embodiment, the bale forming system 26 includes a single idler/drive roller 70*b* (see FIG. 3).

As shown in FIG. 5, each idler roller 70*c* of the bale forming system 26 includes the first bearing type 94*a* and a rotation axis in the first roller axis orientation 90*a*. Each idler roll 70*c* rotates at a second roller speed 92*b* that is different than the first roller speed 92*a*. More specifically, the second roller speed 92*b* is faster than the first roller speed 92*a*. In the illustrated embodiment, the bale forming system 26 includes six idler rollers 70*c* (see FIG. 3).

Each starter roller 70*d* of the bale forming system 26 includes a third bearing type 94*c* different than the first and second bearing types 94*a*, 94*b*, have a rotation axis in the first roller axis orientation 90*a*, and rotate at the first roller speed 92*a*. In the illustrated embodiment, the bale forming system 26 includes one starter roller 70*d* (see FIG. 3).

Each gate roller 70*e* of the bale forming system 26 includes a fourth bearing type 94*d* different than the other bearing types 94*a-c*. Each gate roller 70*e* also has a roller axis in the first roller axis orientation 90*a* and rotates at a third roller speed 92*c* that is different than both the first and second roller speeds 92*a*, 92*b*. More specifically, the third roller speed 92*c* is slower than both the first roller speed 92*a* and the second roller speed 92*b*. In the illustrated embodiment, the bale forming system 26 includes one gate roller 70*e* (see FIG. 3).

While the illustrated bale forming system 26 includes a "belted" system formed from a combination of the above described roller types 70*a-e* and belts 74, it is understood that other roller types having different combinations of bearing types, axis orientations, and rotational speeds may also be present as needed. Furthermore, a non-belted style of bale forming system 26 may be implemented in some embodiments.

In addition to the rollers 70*a-e* described above, the bale forming system 26 may also include other rotational elements that are supported by bearings 82. For example, augers, rotary tine pickups, and the like may be supported by bearings 82 having a pre-determined bearing type 94*a-d*, rotate about an axis of rotation having a predetermined axis orientation 90*a*, and rotate at a predetermined operational speed 92*a-c*. In such embodiments, the below described bearing monitoring features may also be applied to other rotational elements used in the baler 10 beyond the roller described herein.

Illustrated in FIGS. 1-3, the controller 36 of the baler 10 includes a processor 100, a memory unit 104 in operable communication with the processor 100, one or more sensors 108 (e.g., such as an accelerometer 108) sending and receiving signals with the processor 100, and a user interface 112 in operable communication with the processor 100. The processor 100 may also be in operable communication with various elements of the baler 10 such as drive motors, position sensors, actuators, and the like. During use, the processor 100 receives signals from the one or more sensors 108 representative of the overall vibrational power levels in the frame 14, enters the overall vibrational information into one or more algorithms to decompose the vibrational information into a series of component signals, associates the component signals with a corresponding sub-set or group of elements within the baler 10, and then enters the component signals with corresponding group information into another algorithm to monitor and track the operational health of the bearings 82 contained within each group. Upon detection that one or more groups are operating outside the predetermined parameters the processor 100 is configured to output an alert to the user via the user interface 112. By way of the above algorithm, the processor 100 of the baler 10 is able to monitor the health of multiple bearings 82 within the baler 10 using a single accelerometer 108 attached to the frame 14 thereof.

In particular, the baler 10 includes an accelerometer 108 coupled to the frame 14 and configured to detect any vibrational energy in the frame 14 itself. More specifically, the baler 10 includes a single accelerometer 108 fixedly coupled to the cross-tube 62 of the frame 14 at the midpoint thereof (e.g., at the point where the longitudinal axis 46 intersects the cross-tube 62) that is configured to independently detect the magnitude of any accelerations along the X, Y, and Z axis. By being mounted securely to a major element of the frame 14 in a centralized location, the accelerometer 108 is able to more accurately monitor the overall vibrational motion of the baler 10, the rollers 70, and other rotational elements attached thereto. In the illustrated embodiment, the accelerometer 108 includes an Aceinna IMU, however in other embodiments different units having different technical capabilities may be used. Furthermore, while the illustrated accelerometer 108 is mounted directly to the middle of the cross-tube 62, it is understood that in other embodiments the accelerometer 108 may be mounted to other points of the frame 14 including, but not limited to, other positioned on the framework 54 or the panels 58*a*, 58*b*.

While the illustrated baler 10 includes a single accelerometer 108 mounted to the midpoint of the cross-tube 62, it is understood that in other embodiments more accelerometers 108 may be present in the same or different locations. For example, in some embodiments the baler 10 may include a pair of accelerometers 108 mounted on either end of the cross-tube 62. In still other embodiments, the accelerometers 108 may be mounted to the side panels 58*a*, 58*b*. In embodiments where multiple accelerometers 108 are present, the accelerometers 108 may be used to each individually monitor the vibrational outputs of a sub-set of the bearings 82 present in a baler 10—especially in embodiments where the baler 10 includes a sub-frame that is isolated from the frame 14. In still other embodiments, the multiple accelerometers 108 may combine their readings to help achieve greater accuracy and fidelity when monitoring a greater number of bearings 82 in the baler 10.

Figure 4:
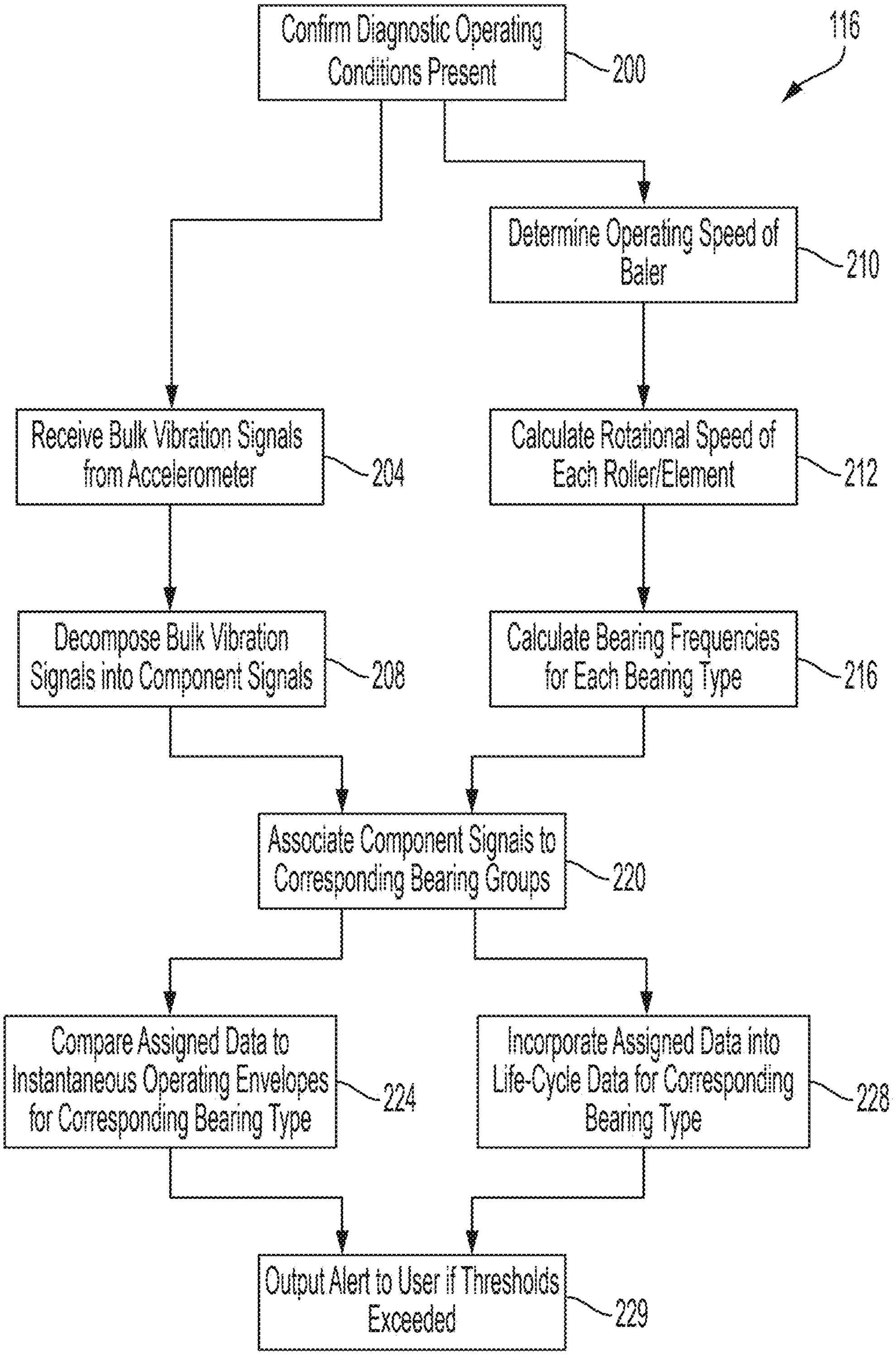
FIG. 4 is a diagram of a bearing diagnostic mode.

During operation of the baler 10, the processor 100 may enter a bearing diagnostic mode 116 (see FIG. 4). Entry into the bearing diagnostic mode 116 may be initiated by the user via the user interface 112 or be triggered automatically by the processor 100 itself. In embodiments where the bearing diagnostic mode 116 is triggered automatically, the processor 100 may do so based on a pre-determined service interval (e.g., after a pre-determined number of hours of operation have passed or every so many calendar days), may be triggered automatically every time the diagnostic conditions are present, may be initiated to correspond with other maintenance tasks associated with the baler, and the like.

Once the bearing diagnostic mode 116 is triggered, the processor 100 is configured to first determine whether the necessary conditions exist to allow the diagnostic test to be conducted (Step 200). More specifically, the bearing diagnostic mode 116 is configured to operate under a set of conditions that allow for maximum accuracy when conducting the analysis. Such conditions may include, but are not limited to, when the bale chamber 64 is empty (e.g., that no crop material is present therein), when the baler 10 is operating at a pre-determined speed or within a predetermined speed range, when the baler 10 is not traveling or if doing so is traveling below a maximum speed, when the gate 60 has reached a certain progression in the closing process, and the like. In the illustrated embodiment, the processor 100 is configured to initiate the bearing diagnostic mode 116 when the gate angle reaches 10 degrees during the closing process and continues the diagnostic mode until the gate 60 reaches a closed position (e.g., the gate angle is 0). While the illustrated diagnostic mode 116 is configured to operate over the final 10 degrees of rotation of the closing process, it is understood that in other embodiments a larger or smaller degree range may be used where more or less time is needed to collect the required volume of data.

Once the processor 100 determines that the proper operating conditions are present, the processor 100 may initiate the bearing diagnostic mode 116. When doing so, the processor 100 is configured to receive a stream of data from the accelerometer 108 representative of the bulk or overall vibrational accelerations of the frame 14 measured independently along the X, Y, and Z axes (Step 204). As stated above, the processor 100 received the above-described data stream while the baler 10 is running and the chamber is empty (e.g., over the period of time when the gate 60 is closing and the gate angle is less than or equal to 10 degrees). More specifically, the accelerometer 108 will output signals representative of the overall vibrational power levels along each of the X, Y, and Z axes.

As the bulk vibration data is received from the accelerometer 108, the processor 100 is then configured to decompose the bulk data into its component signals (Step 208). More specifically, the processor 100 is configured to process the data such that it will show the vibrational power level by frequency along each of the X, Y, and Z axes. To do so, the processor 100 may enter the data into one or more algorithms whose outputs would include the power level present at each frequency. In some embodiments, a Fourier transform, discrete Fourier transform, and/or fast Fourier transforms may be used dependent upon the formatting of the data and the processing power available. In other embodiments, different types of filters and/or algorithms may be used separately or in combination with the various forms of Fourier transforms to decompose and condition the data as desired.

While the processor 100 is receiving and decomposing the bulk vibration data as described above, the processor 100 is also configured to calculate the rotational speed 92*a-c* of each roller 70 within the baler 10 (Steps 210 and 212). To do so, the processor 100 enters information regarding the baler's operating speed into one or more algorithms that model the mechanical layout of the baler 10 including the relative rotational speeds of each roller 70 for a given reference speed (e.g., a speed that can be verified either directly or indirectly). Using the model in memory 104, the processor 100 is able to calculate mathematically the rotational speed 92*a-c* of each roller 70 for the known reference speed at any given time during the analysis.

With the rotational speed 92*a-c* of each roller 70 known, the processor 100 is then able to calculate in real-time the bearing frequency 120*a-e* for each bearing 82 at any given time during the analysis (Step 216). Generally speaking, the bearing frequency 120*a-e* for a given bearing 82 represents the frequency at which an individual element of the bearing 82 (e.g., an individual roller or ball) rotates about the axis of rotation 86 of the corresponding roller 70 (e.g., travels 360 degrees about the axis of rotation 86). More specifically, the processor 100 is configured to enter the rotational speed 92*a-c* of a given roller 70, the corresponding bearing size, and the corresponding bearing element number into an algorithm whereby the algorithm will mathematically calculate the corresponding bearing frequency 120*a-e*.

In the illustrated embodiment, the processor 100 includes pre-formed models of different bearing types stored in memory 104 (e.g., models containing all of the relevant bearing information for a given type) and a database matching specific bearing types to specific rollers 70 upon which the processor 100 is able to reference during operation.

In the illustrated embodiment, the processor 100 is able to minimize the number of calculations needed by grouping bearings having like conditions into a bearing group 124*a-e*. More specifically, each bearing group 124*a-e* contains all rollers 70 whose operating conditions establish that their associated bearings 82 will have the same bearing frequency 120*a-e* for all operating conditions (e.g., all reasonable reference speeds). As such, the processor 100 need only calculate the bearing frequency 120*a-e* of one roller 70 in each group to cover the entire group.

With the decomposed data and bearing frequencies 120*a-e* for each group established, the processor 100 is then configured to combine the two data sets by assigning the appropriate data sets to the corresponding bearing groups 124*a-e* based at least in part on the calculated bearing frequencies 120*a-e* (Step 220). More specifically, the processor 100 is configured to associate the vibration power levels accruing at a given frequency with the bearing group 124*a-e* having a similar calculated bearing frequency 120. Once associated, the processor 100 applies the given data values to each roller 70 categorized within that group 124*a-e*. For example, if a given vibrational power level occurs at 60 Hz and Bearing Group C has a calculated bearing frequency of approximately 60 Hz (±1%, ±1.5%, ±2%, ±2.5%) then the processor 100 is configured to associate the given vibration power level with all six idler rollers 70*c* contained in Bearing Group C. Expanding on the example, if a second vibration power level occurs at 70 Hz and Bearing Group A has a calculated bearing frequency of approximately 70 Hz (±1%, ±1.5%, ±2%, ±2.5%), the second vibration power level will be associated with both drive rollers 70*a* contained in Bearing Group A.

During operation, the manner in which the processor 100 associates a bearing group 124*a-e* with a particular segment of decomposed data may be set by the user and/or refined over time using machine learning.

In some embodiments, the processor 100 may be able to further sub-divide the entries within the various bearing groups 124*a-e* based on additional details if present. For example, if one idle roller 70*c*' (not shown) has an axis of rotation that is set at 90 degrees to the other idle rollers 70*c*, the processor 100 may be able to further deduce what portion of the vibration power levels occurring at 60 Hz are applicable to just the skewed roller 70*c*' based on how the vibration power levels are distributed between the X, Y, and Z axes. While the given example is based on orientation, such deductions may also be made based at least in part on, but not limited to, bearing material, bearing element type, and the like where a feature of the signal can be deduced and attributed to the differing feature.

After the processor 100 has completed associating the decomposed vibration data with the various bearing groups 124*a-e*, the processor 100 may save the data in memory 104 and perform a performance analysis for the bearings 82 in each group 124*a-e*. More specifically, the performance analysis may consist of both an instantaneous analysis (Step 224) and a long-term or life-cycle analysis (Step 228).

For the instantaneous analysis, the processor 100 is configured to compare the current operating conditions to a set of pre-determined operating envelopes regardless of past performance. More specifically, the processor 100 has operating envelopes (e.g., acceptable vibration maximums, acceptable vibration wave form, and the like) saved in memory 104 for each bearing type which it can call upon during the analysis. If the instantaneous data is determined to fall outside the acceptable envelope, the processor 100 is configured to output an alert to the user via the user interface 112 (Step 229) indicating that one or more bearings 82 in the specified group (e.g., Bearing Group A, B, C, or D) have failed or are operating outside the acceptable parameters and should be replaced. In some embodiments, the processor 100 may further take intervening steps in view of an instantaneous alert such as, but not limited to, shutting the baler down, shutting down the portion of the baler 10 associated with the failed bearing group, initiate countermeasures (e.g., fire suppression), and the like.

In addition to instantaneous alerts, the processor 100 is also configured to monitor life-cycle alerts. More specifically, the processor 100 is configured to enter the decomposed and associated data into one or more algorithms configured to map out the anticipated wear cycle of a given bearing type 94*a-d* over time. More specifically, the processor 100 is configured to fit the recently acquired data to the statistical model to calculate how far along the bearing 82 is in its anticipated life-cycle and how much life remains before the bearing 82 should be replaced. In some embodiments, the processor 100 may also use machine learning techniques to update and correct the statistical model based on past data entries (e.g., either local to the current baler 10 or compiled from like balers 10 on a network). In the illustrated embodiment, the processor 100 is configured to monitor the magnitude of the vibration power level associated with a particular bearing group 124*a-e* over time. When the power level exceeds a predetermined maximum value or grows at a rate exceeding a predetermined maximum rate the processor 100 is configured to output an alert to the user via the user interface 112. More specifically, the processor 100 will output an alert to the user indicating that one or more bearings in the identified bearing group 124*a-e* has fallen out of specification and needs to be replaced. In instances where multiple trigger levels are present (e.g., a low, medium, and high trigger levels), the alert may also include the level that has been breached and the tasks required to remedy it (e.g., replacement, adjustment, etc.). In still other embodiments, the processor 100 may further take intervening steps in view of life-cycle alert such as, but not limited to, shutting the baler down, shutting down the portion of the baler 10 associated with the failed bearing group, initiate countermeasures (e.g., fire suppression), and the like.

What is claimed is:

1. A baler comprising:

a frame;

one or more wheels rotatably mounted to the frame;

a bale forming system including:

a first rotational element rotatably coupled to the frame by a first bearing for rotation about a first axis, wherein the first bearing is a first bearing type, a second rotational element rotatably coupled to the frame by a second bearing for rotation about a second axis, wherein the second bearing is a second bearing type different than the first bearing type, a third rotational element rotatably coupled to the frame by a third bearing for rotation about a third axis that is parallel to the first axis, wherein the third bearing is the first bearing type, and a fourth rotational element rotatably coupled to the frame by a fourth bearing for rotation about a fourth axis that is parallel to the second axis, wherein the fourth bearing is the second bearing type; and an accelerometer coupled to the frame and configured to output a bulk signal representative of a total vibrational power in the frame; and a controller in operable communication with the accelerometer, where the controller is configured to deconstruct the bulk output signal provided by the accelerometer into at least a first component signal and a second component signal, and wherein the controller is configured to associate the first component signal with a first bearing group including the first bearing and the third bearing, and wherein the controller is configured to associate the second component signal with a second bearing group including the second bearing and the fourth bearing.

2. The baler of claim 1, wherein the controller deconstructs the bulk output signal into two or more component signals by decomposing the component signals by frequency.

3. The baler of claim 2, wherein the controller deconstructs the bulk output signal by passing the bulk output signal through a form of a Fourier transform.

4. The baler of claim 2, wherein the first rotational element rotates about the first axis at a first rotational speed, wherein the third rotational element rotates about the third axis at the first rotational speed, and wherein the controller is configured to calculate a first bearing frequency for the first bearing and the third bearing based at least on the first rotational speed.

5. The baler of claim 4, wherein the controller associates the first component signal with the first bearing group based at least in part on the first bearing frequency.

6. The baler of claim 1, wherein the controller is configured to compare the first component signal and the second component signal with a pre-determined set of operating parameters.

7. The baler of claim 6, wherein the pre-determined set of parameters is modeled at least in part on the first bearing type.

8. The baler of claim 1, wherein the first rotational element and the second rotation element rotate at a first speed.

9. The baler of claim 1, wherein at least one of the first rotating element and the second rotating element includes a roller configured to at least partially support a belt thereon.

10. The baler of claim 1, wherein the controller is configured to calculate a first bearing frequency for the first bearing based at least in part on a bearing size and a bearing element number.

11. A method of monitoring a health of a a first bearing group and a second bearing group in a baler having a frame and an accelerometer fixedly coupled to the frame, wherein the first bearing group includes at least two rotational elements of a first bearing type, and wherein the second bearing group includes at least two rotational elements of a second bearing type different than the first bearing type, the method comprising:

outputting a bulk signal representative of a vibrational power within the frame;
deconstructing the bulk signal into a first component signal and a second component signal;
associating the first component signal with the first bearing group;
associating the second component signal with the second bearing group;
comparing the first component signal to a first set of operational parameters;
comparing the second component signal to a second set of operational parameters; and
outputting an alert if at least one of the first component signal falls outside the first set of operational parameters and the second component signal falls outside the second set of operational parameters.

12. The method of claim 11, wherein deconstructing the bulk signal into the first component signal and the second component signal includes running the bulk signal through a form of Fourier transform.

13. The method of claim 11, wherein associating the first component signal with the first bearing group includes:
calculating a bearing frequency for the first bearing group; and
associating the first component signal with the first bearing group based at least in part on the calculated bearing frequency.

14. The method of claim 13, wherein deconstructing the bulk signal into the first component signal and the second component signal includes deconstructing component vibration power levels by frequency.

15. The method of claim 11, wherein outputting a bulk signal representative of the vibrational power within the frame includes outputting a bulk signal representative of the vibrational power within the frame along an X, a Y, and a Z axis.

16. The method of claim 11, wherein the first set of operational parameters is based at least in part on the first bearing type.

17. The method of claim 11, wherein comparing the first component signal to the first set of operational parameters includes compiling vibration data from the first component signal over a predetermined period of time and comparing the compiled vibration data to a statistical model of an anticipated life-cycle of the first bearing type.

18. The method of claim 11, wherein comparing the first component signal to the first set of operational parameters includes compiling vibration data from the first component signal over a period of time and entering the vibration data into an algorithm configured to map out an anticipated wear cycle of the first bearing type.

* * * * *